United States Patent [19]

Rosenbaum et al.

[11] Patent Number: 4,539,438
[45] Date of Patent: Sep. 3, 1985

[54] ACTIVE IMPEDANCE TRANSFORMER ASSISTED LINE FEED CIRCUIT WITH SUPERVISION FILTERING

[75] Inventors: Stanley D. Rosenbaum, Ottawa; Zdenek J. Holy, Nepean, both of Canada

[73] Assignee: Northern Telecom Limited, Montreal, Canada

[21] Appl. No.: 525,398

[22] Filed: Aug. 22, 1983

[51] Int. Cl.³ .................... H04M 1/76; H04M 19/00
[52] U.S. Cl. ................... 179/18 FA; 179/16 F
[58] Field of Search ........... 179/18 FA, 77, 99 LC, 179/18 HB, 16 AA, 16 F

[56] References Cited

U.S. PATENT DOCUMENTS

| | | | |
|---|---|---|---|
| 4,321,430 | 3/1982 | Ferrieu | 179/18 FA |
| 4,433,213 | 2/1984 | Albers et al. | 179/18 FA |
| 4,484,032 | 11/1984 | Rosenbaum | 179/18 FA |

Primary Examiner—Gene Z. Rubinson
Assistant Examiner—Elio DiVito
Attorney, Agent, or Firm—J. E. Moorhouse

[57] ABSTRACT

A supervision filtering function is included in a line circuit wherein tip and ring voltage amplifiers supply energizing current to a two wire communication line via tip and ring primary windings of a transformer and tip and ring feed resistors. The tip and ring amplifiers operate in response to a control circuit which is differentially responsive to resistively coupled voltage signals corresponding to current flows in the tip and ring feed resistors, and which is also differentially responsive to a.c. signals from a secondary winding of the transformer being coupled via a resistive capacitive network to an amplifier in the control circuit. An output of the amplifier provides a supervisory signal. A feed switch is operable by a ring signal to conduct ringing currents to the communication line via the tip and ring feed resistors to the exclusion of the tip and ring primary windings. A control switch is also operated at the same time by the ring signal to open circuit the secondary winding of the transformer such that a resistive capacitive network causes the amplifier to function as a low pass filter to reduce a.c. signal components in the supervisory signal.

8 Claims, 3 Drawing Figures

ACTIVE IMPEDANCE TRANSFORMER ASSISTED LINE FEED CIRCUIT WITH SUPERVISION FILTERING

The invention relates to line interface circuits for supplying energizing current and ringing signals to a communication line.

In a previous U.S. application Ser. No. 406,115, filed by S. D. Rosenbaum, one of the present inventors, on Aug. 6, 1982 and entitled "Active Impedance Transformer Assisted Line Feed Circuit", a line feed circuit is described which includes tip and ring voltage amplifiers having outputs being resistively coupled via tip and ring feed resistors and tip and ring transformer windings to tip and ring terminals for connection to a communication line. A control circuit includes a differential input being connected to a resistive network associated with the feed resistors and to a secondary winding of the transformer. The tip and ring voltage amplifiers are controlled by the control circuit to have effective output d.c. resistances and a.c. impedances as preferred for operation of a telephone line.

The description of the line feed circuit was not concerned with various ancillary functions often included in practical line feed circuits. At that time provision of other functions such as a supply of ringing current and ringing signal supervision were more or less assumed to be functions not directly affecting the design of the example embodiments described in the application as these functions and circuit means for same are well known to persons of normal skill in the field of telephony lines and line circuits.

The supply of supervisory signals for control of ringing currents for a telephone line is typically provided through a low pass filter which is followed by a threshold circuit for detecting a transition from an ON HOOK state to an OFF HOOK state of the telephone line. The low pass filter is connected to a supervision signal output lead of the line feed circuit during a ringing portion of a telephone call progress. The low pass filter substantially reduces a.c. signal components resulting from ringing currents on the telephone line while passing signals resulting from direct current on the telephone line to the threshold circuit. The threshold circuit detects the OFF HOOK state in response to the filtered signal being of a value indicating a direct line current of less than about 20 milliamps or more. This detection is used to subsequently disconnect a ringing supply and thereafter activate a talking battery supply via the line feed circuit.

Subsequent to the previously mentioned application, it has been realized that the control circuit in various examples of the line circuit described therein is subject to modification such that the function of filtering the supervisory signal is obtained with less complexity and cost than was previously expected. Furthermore it has been realized that with additional modification the function of ringing signal supervision is more efficiently provided.

One example of a line circuit wherein the invention is useful includes tip and ring terminals for terminating to a two wire communication line. Tip and ring amplifiers have outputs connected in series with tip and ring primary windings of a transformer and tip and ring feed resistors to the tip and ring terminals for supplying the communication line with energizing currents. A control circuit is differentially responsive to resistively coupled voltage signals corresponding to current flows in the tip and ring feed resistors and is responsive to a.c. signals from a secondary winding of the transformer being coupled via a resistive capacitive network to an amplifier in the control circuit. The control circuit provides a supervisory signal for indicating the state of the communication line as being one of ON HOOK and OFF HOOK, and during the OFF HOOK state provides a control signal for the operation of the tip and ring amplifiers. A feed switch provides for conduction of the energizing currents via the tip and ring feed resistors and the tip and ring primary windings. In accordance with the invention the feed switch is operable in response to a ring signal to conduct ringing currents via the tip and ring feed resistors to the exclusion of the tip and ring primary windings. A control switch is responsive to the ring signal for open circuiting the secondary winding of the transformer such that the amplifier in the control circuit in combination with the resistive capacitive network, functions as a low pass filter to reduce a.c. signal components in the supervisory signal.

Example embodiments of the invention are discussed with reference to the accompanying drawings in which.

Figure 1:
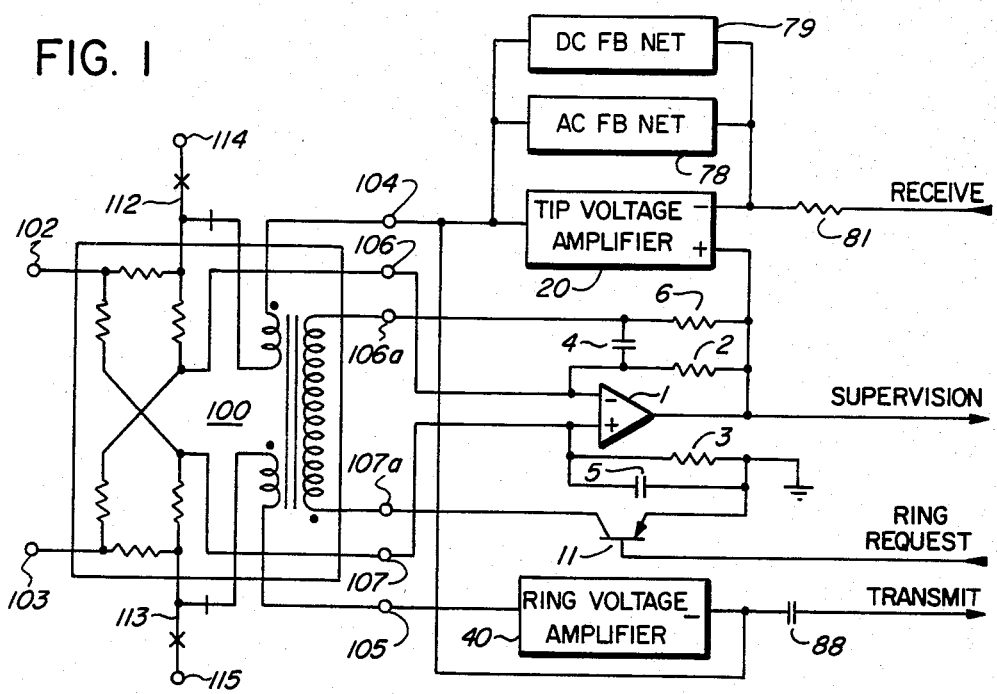
FIG. 1 is a schematic diagram of a line circuit in accordance with the invention.
Figure 3:
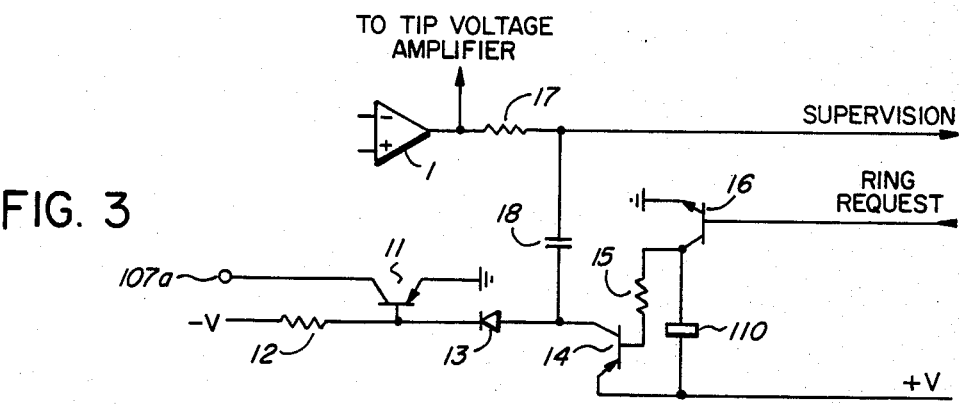
FIG. 3 is a schematic diagram of an alternate embodiment of parts of the line circuits illustrated in FIGS. 1 and 2.

The line circuit in FIG. 1 is generally of similar form and functions as a line circuit described in the previously mentioned application, that is except for a control switch which is provided by a transistor 11 and transfer contacts 112 and 113. Very briefly the transistor 11 is responsive to be ON in the absence of a ring signal which can be supplied from an associated telephone switching facility, not shown, via a ring request lead. In the presence of the ring signal the transistor 11 is biased OFF thereby open circuiting a secondary winding of a transformer connected at terminals 107a and 106a. This in turn causes a resistive capacitive network provided by components 4 and 6 to function as an a.c. feed back path around an amplifier 1 so that it is substantially limited to passing signals, including direct current and frequency components of lesser frequency than an a.c. component of a typical telephone ringing signal. The output of the amplifier 1 is directly useable in most cases as a supervisory signal suitable for OFF HOOK detection during an active portion of a ringing cadence in a telephone call progress. FIG. 3 illustrates an additional switched filter (17 and 18) which is particularly useful in a case where ringers of up to for example five telephones are supplied with ringing current via the telephone line.

Considering FIG. 1 in more detail a network 100 terminates at tip and ring terminals 102 and 103 which are for connection to a two wire communication line, not shown. The network 100 is connected to the remainder of the line circuit via terminals 104, 105, 106, 106a, 107 and 107a as shown. The remainder of the line circuit is preferably provided in an integrated circuit form, except for a few discrete components, such as some capacitors, which are not practical to integrate. As these capacitor components contribute significantly to the total cost of the line circuit it is an advantage of the invention that a ringing supervision filter function in the line circuit is implemented using one of the capacitive components for two different functions. The network 100 includes a serial connection of a tip feed resistor and a tip primary winding between the terminals 102 and 104 via a break portion of the transfer contact 112. A ring feed resistor and a ring primary winding are serially connected between the terminals 103 and 105 via a break portion of the transfer contact 113. A tip voltage tap of a tip voltage divider is connected to the terminal 106. A ring voltage tap of a ring voltage divider is connected to the terminal 107. The secondary winding is connected across the terminals 106a and 107a. The tip primary, ring primary and secondary windings are arranged about a miniature transformer core and are poled as indicated by dot convention in FIG. 1. The transfer contacts 112 and 113 each include make portions which terminate at terminals 114 and 115 for connection across a supply of ringing current, not shown.

Although the structure of the integrated circuit portion is of some variance with respect to examples described in the previously mentioned patent application the operation is substantially the same. A control circuit is provided by the amplifier 1 and the associated resistive components 2, 3 and 6 and the associated capacitive components 4 and 5. The amplifier 1 is differentially responsive to d.c. resistively coupled voltage signals from the terminals 106 and 107 which are representative of currents traversing the tip and ring feed resistors, for providing a d.c. bias to a non-inverting input of a tip voltage amplifier 20. The response of amplifier 1 to a.c. signals from terminals 106 and 107 is greatly diminished by negative feedback through capacitor 4 and by a low a.c. impedance to ground presented by capacitor 5. However, the amplifier 1 is responsive to inductively coupled signals from the terminal 106a, the terminal 107a being normally grounded via transistor 11. These signals are capacitively coupled via the capacitor 4 and provide an a.c. drive signal for the non-inverting input of the tip voltage amplifier 20. A.C. and d.c. feedback networks 78 and 79 are connected across the tip voltage amplifier between an inverting input and an output thereof for predetermining the response of the tip voltage amplifier 20 to the signal at its input such that it operates with predetermined output impedance and resistance characteristics. A ring voltage amplifier 40 includes an output connected at the terminal 105 and an input connected at the terminal 104. The ring voltage amplifier is arranged to have unity gain and merely inverts the signals appearing at the terminal 104 to provide complementary signals at the terminal 105. Transmit and receive leads are for connection to a hybrid circuit, not shown, in association with the telephone facility. A.C. signals for transmission via the communication line are coupled from the receive lead via a resistor 81 to the tip voltage amplifier. All of the a.c. signals on the communication line are coupled from the terminal 104 via a capacitor 88 to the transmit lead.

A circuit via the secondary winding is provided by the transistor 11 which is normally maintained ON. A direct current flow from ground to the output of the amplifier 1 traverses a path which includes the resistor 6, the terminal 106a, the secondary winding in the network 100, the terminal 107a, and the collector and emitter electrodes of the transistor 11. The direct current is modulated by a.c. differential communication line signals being inductively coupled to the secondary winding from the tip and ring primary windings. The direct current also has a beneficial effect in that in the illustrated line circuit the miniature core is d.c. flux compensated in accordance with the ohmic value of resistor 6.

During ON HOOK periods of operation the line circuit normally supplies little or no current to the communication line. Normal OFF HOOK operation commences when the external resistance applied between the terminals 102 and 103 falls to a value of less than a maximum of about 2000 ohms. Therefore in the ON HOOK condition the amplifier 1 is used to to provide a supervisory signal on a supervisory lead for indicating the ON HOOK state to the associated telephone facility. For this purpose the amplifier 1 is responsive to the voltage at the tip voltage tap and the ring voltage tap terminals 106 and 107. During the ON HOOK state these voltages are substantially the same. These voltages diverge upon a transition to the OFF HOOK state, the voltage at the tip voltage tap becoming more negative and the voltage at the ring voltage tap becoming more positive. This causes the output of the amplifier 1 to correspondingly become more negative to provide a supervisory signal indication of the OFF HOOK state. During the OFF HOOK state the amplifier also provides d.c. bias and a.c. voice band signals for the operation of the tip voltage amplifier 20 and consequently the ring voltage amplifier 40.

During ON HOOK operation in a ringing portion of a call progress, the transfer contacts 112 and 113 are operated to supply ringing current via the terminals 114 and 115, and the tip and ring feed resistors to the tip and ring terminals 102 and 103. At the same time the transistor 11 is switched OFF, open circuiting the secondary winding. Where before the amplifier 1 was equally responsive to both d.c. and a.c. tip and ring signals, the a.c. signal response being primarily determined by inductive coupling, its a.c. response, with no inductive coupling is now determined by the resistor 2 in combination with an a.c. feed back path provided by the resistor 6 and the capacitor 4. The amplifier 1 is therefore reconfigured during the ringing portion of the call progress to be a low pass filter. Thus the supervisory signal is provided at the output of the amplifier 1 with very little of the a.c. component of the ringing currents. The supervisory signal is therefore a useful indication of a direct current component of the ringing current in exactly the same manner in which it is used for indicating the normal energizing line current.

Figure 2:
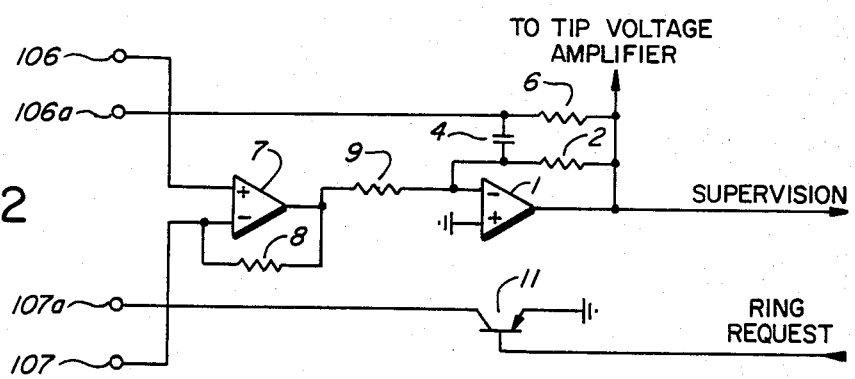
FIG. 2 is a schematic diagram of part of the line circuit in FIG. 1, illustrating another embodiment thereof.

The circuit in FIG. 2 reduces the discrete component capacitor count by one more in comparison with the line circuit in FIG. 1. This is achieved by adding a differential amplifier 7 for differentially amplifying the tip and ring voltage signals with a gain as being adjusted by the ohmic value of a resistor 8. The output of the amplifier 7 is coupled to the inverting input of the amplifier 1. This requires that only the capacitor 4 be used for a.c. coupling of the secondary winding and the capacitor 5 in FIG. 1 is eliminated in FIG. 2.

The circuit in FIG. 3 provides among other features further filtering of a.c. signal components in the supervisory signal so that the higher ringing currents, typical of communication lines with multiple telephone station apparatus, are accommodated. As before illustrated the output of the amplifier 1 is connected to the tip voltage amplifier 20. The output is also resistively connected to the supervision lead via a resistor 17. A capacitor 18 is connected between the supervision lead and a collector electrode of a transistor 14. The collector electrode of the transistor 14 is also connected to a negative voltage supply −V via a diode 13 and a resistor 12. A junction between the resistor 12 and the diode 13 is connected to a base electrode of the transistor 11. A relay includes an operate coil 110 in association with the transfer contacts 112 and 113. The relay is operated by a transistor 16 which is connected in series with the relay operate coil 110 between ground and a positive voltage supply +V. The collector electrode of the transistor 16 is also connected by a resistor 15 to a base electrode of the transistor 14.

In operation a ring signal received on the ring request lead causes the transistor 16 to switch ON thus operating the relay coil 110 and its associated transfer contacts to supply the communication line with ringing current. At the same time the transistor 14 is also switched ON via the resistor 15 to provide an a.c. ground to the capacitor 18 so that the capacitor 18 in combination with the resistor 17 provides a low pass filter function for signals on the supervision lead. At the same time, the transistor 14 also provides turn OFF bias for the transistor 11 so that the secondary winding is open circuited. When the ring signal on the ring request lead is withdrawn the transistors 16 and 15 each turn OFF. After an operate delay time the relay transfer contacts return to a non operated position thereby disconnecting the terminals 114 and 115 and re-establishing connection between the tip and ring terminals 102 and 103 and the outputs of the tip and ring voltage amplifiers 20 and 40 respectively.

What is claimed is:

1. A line circuit for terminating a two wire communciation line at tip and ring terminals, comprising:
    a transformer having tip and ring primary windings and a secondary winding;
    tip and ring feed resistors;
    tip and ring amplifiers for supplying energizing currents for operation of the communication line, the tip and ring amplifiers having outputs being series connected to the tip and ring terminals via the tip and ring primary windings and the tip and ring feed resistors respectively;
    a feed switch for conducting the energizing currents via the tip and ring feed resistors and the tip and ring primary windings, and being operable in response to a ring signal for conducting ring currents via the tip and ring feed resistors to the exclusion of the tip and ring windings;
    a resistance network including tip and ring voltage taps, the resistance network being connected in combination with the tip and ring feed resistors for supplying voltage signals being indicative of currents in the tip and ring feed resistors at tip and ring voltage taps;
    a control circuit being differentially responsive to the voltage signals at the tip and ring voltage taps and being responsive to a.c. signals from the secondary winding being coupled via a resistive capacitive network to an amplifier in the control circuit, for providing a supervisory signal for indicating the state of the communication line as being one of ON HOOK and OFF HOOK, and during the OFF HOOK state for providing a control signal for operation of the tip and ring amplifiers; and
    control switch means being responsive to the ring signal for open circuiting the secondary winding such that the amplifier in the control circuit in combination with the resistive capacitive network functions as a low pass filter to reduce a.c. signal components in the supervisory signal.

2. A line circuit as defined in claim 1 wherein the resistive capacitive network includes a first resistor being connected to an output of the amplifier in the control circuit and a first capacitor being connected between the first resistor and an inverting input of said amplifier, and wherein the secondary winding is connected between the control switch means and a junction of the first resistor and the first capacitor.

3. A line circuit as defined in claim 1 wherein the amplifier in the control circuit is a differential amplifier having inverting and non-inverting inputs being connected to the tip and ring voltage taps respectively, the resistive capacitive network includes a first resistor and a first capacitor connected in series between an output of the differential amplifier and the inverting input, and a resistor connected in parallel with a capacitor between ground and the non-inverting input, the control switch means includes a semiconductor device and the secondary winding is connected between the semiconductor device and a junction of the first capacitor and the first resistor such that a direct current path between the output of the differential amplifier and ground is provided via the first resistor, the secondary winding and the semiconductor device in the absence of the ring signal.

4. A line circuit as defined in claim 1 further comprising:
    a filter network being connected in series with the output of the amplifier in the control circuit and having an output for providing the supervisory signal; and
    means for a.c. grounding a port of the filter network for causing the filter network to have a low pass characteristic in response to the presence of the ring signal, whereby the a.c. signal components in the supervisory signal are further reduced at the output of the filter network.

5. A line circuit as defined in claim 2 wherein the control switch means is a semiconductor device connected to be in saturation conduction via the secondary winding and the first resistor in the absence of the ring signal and to be biased OFF in response to the ring signal.

6. A line circuit as defined in claim 5 wherein the semiconductor device is a first transistor being connected in series with the secondary winding and including a control electrode being resistively connected via a second resistor to a first bias potential.

7. A line circuit as defined in claim 6 wherein the feed switch comprises a relay having an operating coil and associated contacts and being functional to switch from supplying said ringing currents to supplying said energizing currents, the line circuit further comprising:
    a filter network including a third resistor being connected in series with the output of the amplifier in the control circuit and a second capacitor being connected in series with the third resistor, the supervisory signal being provided at a junction of the third resistor and the second capacitor;
    a second transistor being connected in series between a second bias potential and the second capacitor and including a control electrode connected to be responsive to the ring signal; and
    a diode being connected in series between a junction of the second resistor and the first transistor and a junction of the second capacitor and the second transistor, the diode being polled such that when the second transistor is turned ON in response to the presence of the ring signal the first transistor is turned off.

8. A line circuit including tip and ring terminals for connection to a two wire communication line, tip and ring amplifiers having outputs connected in series with tip and ring primary windings of a transformer and tip and ring feed resistors to the tip and ring terminals for supplying the communication line with energizing currents, a control circuit, being responsive to a.c. signals from a secondary winding of the transformer being coupled via a resistive capacitive network to an amplifier in the control circuit, for providing a supervisory signal for indicating the state of the communication line as being one of ON HOOK and OFF HOOK, and for providing a control signal for operation of the tip and ring amplifiers, the line circuit being characterized by:

a feed switch for conducting the energizing currents via the tip and ring feed resistors and the tip and ring primary windings and being operable in response to a ring signal for conducting ringing currents via the tip and ring feed resistors to the exclusion of the tip and ring primary windings;

control switch means being responsive to the ring signal for open circuiting the secondary winding such that the amplifier in the circuit in combination with the resistive capacitive network functions as a low pass filter to reduce a.c. signal components in the supervisory signal.

* * * * *